United States Patent [19]

Albrecht

[11] Patent Number: 4,848,405
[45] Date of Patent: Jul. 18, 1989

[54] INSERT MEANS FOR FLUID FLOW SYSTEM

[76] Inventor: David E. Albrecht, 1383 Granary Rd., Blue Bell, Pa. 19422

[21] Appl. No.: 776,496

[22] Filed: Sep. 16, 1985

[51] Int. Cl.[4] ............................................. F16K 27/00
[52] U.S. Cl. .................................... 137/884; 411/403; 411/427
[58] Field of Search ........................ 137/269, 271, 884; 411/119–124, 403, 427

[56] References Cited

U.S. PATENT DOCUMENTS

| | | | |
|---|---|---|---|
| 3,111,139 | 11/1963 | Beckett et al. | 137/884 |
| 3,158,164 | 11/1964 | Barton | 137/884 X |
| 3,215,158 | 11/1965 | Barr, Jr. et al. | 137/269 |
| 3,509,904 | 5/1970 | Olson | 137/269 |
| 3,563,131 | 2/1971 | Ridley, Sr. | 411/427 X |
| 3,654,960 | 4/1972 | Kiernan | 137/884 |
| 4,271,870 | 6/1981 | Butler et al. | 137/318 X |
| 4,334,785 | 6/1982 | Black | 277/DIG. 6 |

FOREIGN PATENT DOCUMENTS

| | | | |
|---|---|---|---|
| 1325312 | 3/1963 | France | 411/403 |
| 720215 | 3/1980 | U.S.S.R. | 411/119 |

*Primary Examiner*—John Fox
*Attorney, Agent, or Firm*—Frank A. Follmer

[57] ABSTRACT

An insert means for a fluid flow system includes a plurality of stacking bolts adapted to be connected in end-to-end relation. Each stacking bolt has an externally threaded male end and an enlarged portion providing an internally threaded female end. A wrenching surface is provided on the enlarged portion.

33 Claims, 8 Drawing Sheets

INSERT MEANS FOR FLUID FLOW SYSTEM

BACKGROUND OF THE INVENTION

This invention relates generally to an insert means for a fluid flow system. More particularly, this invention relates to an insert means of the type described in my copending application Ser. No. 638,351, filed Aug. 6, 1984.

The prior art is exemplified by the patents cited against said prior-mentioned copending application and U.S. Pat. No. 3,654,960 which discloses a modular hydraulic system comprised of housing units which are coupled to similar units by means of bolts connected in end-to-end relationship.

SUMMARY OF THE INVENTION

This invention is directed to a novel stacking bolt which performs the function of the female-to-male stud adapter described in my copending application but has some advantages thereover in certain applications. As is the case with said prior-mentioned stud adapter, the stacking bolt of the invention is constructed and arranged to allow for the infinite stacking of components in an end-to-end manner with a minimum overall length and with a minimum number of seals. The stacking bolt of the present invention can also utilize the rotational retainer means described in said copending application, which means ensures that the last bolt in a series will loosen as opposed to any other.

A feature of the stacking bolt of the present invention is that it can be engaged with an ordinary socket wrench. In addition, the design of the stacking bolt is such that there is less chance of damaging the male threads on the stacking bolt during the assembly of the insert means in stacked relationship.

Briefly stated, the stacking bolt of the present invention comprises a stem portion providing an externally threaded male end and an enlarged diameter portion providing an internally threaded female end. The enlarged diameter portion of the stacking bolt forms a bearing surface facing toward the male end thereof and is constructed and arranged to contact one of the mating faces of the component to be coupled during the assembly thereof in stacked relation. The enlarged diameter portion is provided with a wrenching surface adapted to be engaged by a wrench or the like. The female end is formed by an internally threaded bore in the end of the stacking bolt and is contained within the enlarged diameter portion and adapted to be threadedly engaged by a bolt or another stacking bolt of the invention.

The stacking bolt of the invention has several novel features over the prior art stacking bolts. Firstly, the wrenching portion is not in series with the internal threads of the female end. Accordingly, the length of the enlarged portion is minimized and longer than normal bolts are not needed to fasten the next component in the stack. The reason that the wrenching portion does not have to be in series with the internal threads is that the enlarged portion having the wrenching portion thereon is not enveloped in the counterbore of the component being fastened. Such a counterbore construction is employed in the stacking bolts of the prior art. Another advantage of the design of the invention results from the construction and arrangement whereby the rotational retainer concept can be employed. This advantageous feature cannot be employed with the bolts of the prior art.

DETAILED DESCRIPTION OF THE PREFERRED EMBODIMENTS

Figure 1:
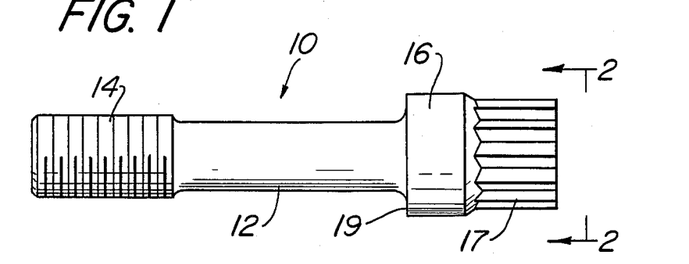
FIG. 1 is a side view showing a stacking bolt in accordance with the invention.
Figure 2:
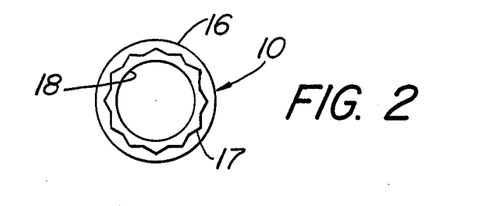
FIG. 2 is an end view taken on line 2—2 of FIG. 1.
Figure 3:
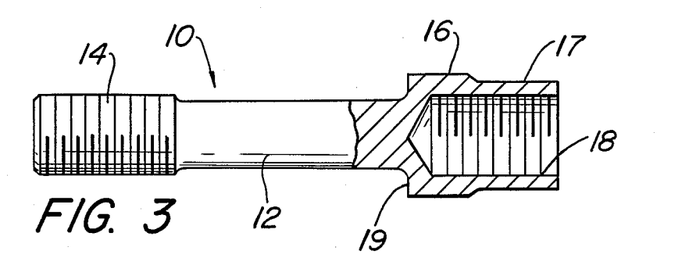
FIG. 3 is a view similar to FIG. 1 with the female end of the stacking bolt broken away to illustrate the construction of this end.

In accordance with the invention there is provided a novel means for coupling the insert bodies together in stacked relation, such means comprising a plurality of stacking bolts indicated generally at 10. Referring to FIGS. 1–3, each stacking bolt 10 has a stem portion 12 providing an externally threaded male end 14. Each stacking bolt 10 also includes an enlarged diameter portion 16 providing an internally threaded female end by means of a threaded bore 18 extending inwardly from the female end of stacking bolt 10 as is best shown in FIG. 3. As shown in FIG. 3 the threaded bore 18 is contained within the enlarged diameter portion 16 of stacking bolt 10. The enlarged diameter portion 16 is provided with a wrenching portion 17 extending inwardly from the female end of stacking bolt 10 and having a surface configuration adapted to be engaged by a wrench or the like. Wrenching portion 17 is provided with a twelve pointed construction which is especially designed for engagement by the socket wrenches in use today. This construction is best shown in FIG. 2.

An annular bearing surface 19 is formed at the inner end of enlarged diameter portion 16 and faces toward the male end 14. As will be described more fully hereafter, bearing surface 19 is constructed and arranged to contact a mating face of the body of an insert in which the stem portion 12 thereof extends during the coupling together of adjacent inserts. The bearing surface 19 is also designed to allow the stacking bolt 10 to be preloaded during the fastening operation as will be described hereafter.

As is apparent in FIGS. 1–3, the externally threaded male end 14 and stem portion 12 extending from the bearing surface 19 are of a smaller diameter than the outer diameter of the bearing surface 19.

The dimensional configuration of the stacking bolt 10 and the dimensional analysis thereof is similar to that of the female-to-male stud adapter as disclosed and described in my copending application.

Thus, the geometry of the stacking bolt 10 must be such that the tensile area of the effective area of the bearing surface 19 meets or exceeds the area within the minor diameter of the male thread 14. Also, the enlarged diameter portion 16 must be of such a length to allow sufficient engagement of a male thread 14 into the female thread in the threaded bore 18 by the male end of a coupled stacking bolt. Sufficient engagement of the thread is defined at the length needed so as not to shear (strip) the threads under a working load. The calculations for determining this engagement length is described in my copending application.

Figure 4:
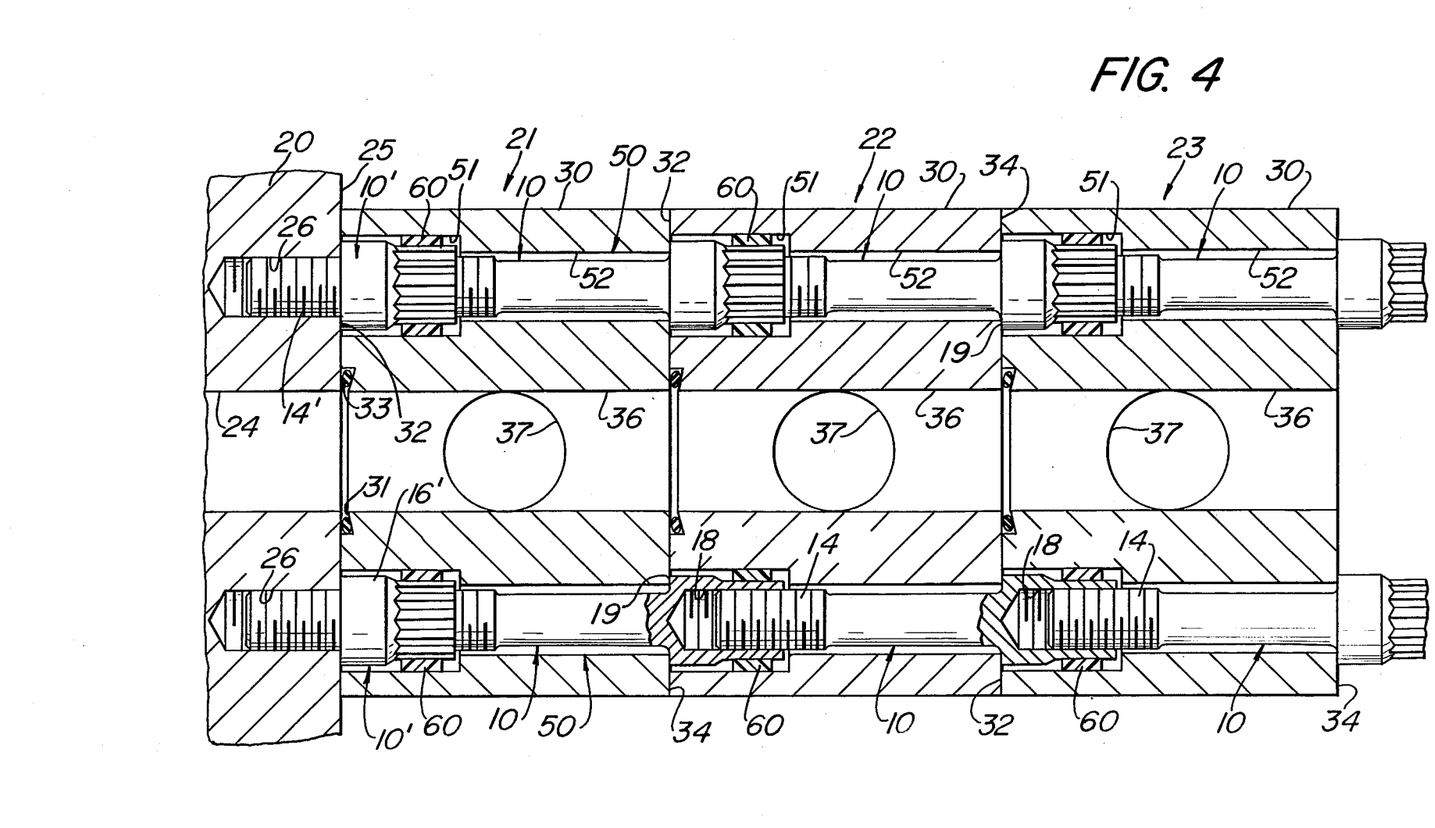
FIG. 4 is a sectional view showing a plurality of the insert means connected in stacked relation by the use of the stacking bolts in accordance with the invention.

FIG. 4 shows a plurality of insert means 21, 22 and 23 in accordance with the invention coupled to one another in end-to-end stacked relation. Each of the insert means 21, 22 and 23 comprises a body 30 and a plurality of stacking bolts 10 associated therewith. Body 30 is a block construction providing six flat rectangular faces including end faces 32 and 34 adapted to mate with corresponding faces of the fluid flow components of the system adjacent thereto. Body 30 has a fluid flow passage 36 for the flow of fluid between faces 32 and 34. In FIG. 4 the insert means 21 is mounted onto a fluid flow component 20 which, by way of example, may contain a pump which delivers fluid under pressure through a discharge opening 24 in face 25 thereof. With the parts coupled together as shown in FIG. 4, discharge opening 24 is in flow communication with the flow passage 36 of the body 30 of insert means 21 adjacent thereto at mating faces 25 and 32. Flow passages 36 of bodies 30 of insert means 21, 22 and 23 are in flow communication as shown in FIG. 4.

Each of the bodies 30 is provided with a cross passage 37 to deliver fluid from passage 36 through side faces of the bodies 30 for use in the fluid flow system as desired. The opening of each passage 36 at end face 32 is provided with a counterbore 31 which receives an 0-ring type of seal 33 which is concentric with passage 36 and is adapted to seal the joint between the aligned flow passages 36 and 24 to seal the fluid flow between the mating faces of adjacent coupled bodies 30 as is shown in FIG. 4. It will be apparent that additional flow components may be coupled to the bodies 30 at the side faces thereof as desired for the particular fluid flow system in which these components are contained.

The insert means of the invention comprises a novel stacking bolt design for coupling the bodies 30 together and with the associated fluid component 20. Typically, as described in my copending application, there are provided four of these stacking bolts 10 arranged in a standard symmetrical rectangular configuration around the flow passage 36 which is located centrally within the body 30.

Each of the bodies 30 is provided with a bore means 50 for accommodating each of the four stacking bolts 10 associated therewith. Each of the bore means 50 extends through body 30 between the faces 32 and 34 and is provided with an enlarged bore portion 51 adjacent the face 32 and a cylindrical bore portion 52 extending from enlarged bore portion 51 to the face 34. Enlarged bore portion 51 is adapted to receive an enlarged diameter portion 16 of the stacking bolt 10 and cylindrical portion 52 is adapted to receive a stem portion 12 of stacking bolt 10. Each of the bore means 50 is constructed so that an enlarged diameter portion 16, which includes a wrenching portion 17, of the stacking bolt 10 is contained entirely within the enlarged bore portion 51 and so that the distance between the bearing surface 19 and the male end 14 of the stem portion 12 is less than the distance between the two faces 32 and 34 of a body 30.

When the insert means in accordance with the invention is mounted onto the flow component and a series of bodies are coupled to one another in end-to-end stacked relation, a unique assembly procedure is utilized. This procedure was described in my copending application and is utilized in the stacking bolt arrangement of this invention. The first step in the procedure is to screw a modified size stacking bolt 10' into the threaded bolt holes 26 in the flow component 20. Except for the shortened stud portion, stacking bolts 10' are identical to stacking bolt 10 wherefore corresponding parts have been given like reference numerals with primes added. The stacking bolts 10' have an externally threaded male end 14' which is threadedly received in bolt holes 26 in flow component 20. The stacking bolts 10' contain an identical enlarged diameter portion 16' to that of the stacking bolts 10 as is apparent from a consideration of FIG. 4. The stacking bolts 10' are threaded onto the flow component 20 to bring bearing surfaces 19' thereof in bearing contact with face 25 to thereby present an arrangement whereby the enlarged diameter portions 16' of each stacking bolt 10' project from the face 25 of flow component 20. During this step, the wrenching portion 17' of the stacking bolts 10' are used to turn the same to produce a preloaded contact of bearing surfaces 19' with the mounting surface of face 25 without any permanent deformation of this contact area.

The next step is to slide body 30 of insert means 21 over the enlarged diameter portions 16' of stacking bolts 10' which portions 16' slide completely into the enlarged bore portion 51 of the bore means 50 of this body 30. This step is made easier than prior art assembly procedures by reason of the arrangement wherein the mounted stacking bolts 10' provide the supporting structure for the body 30 as it is slid into position.

The next assembly step is to couple body 30 of the insert means 21 to the flow component 20. In this step, the stacking bolts 10 associated with the first body 30 are inserted through the bore means 50 thereof and the male ends 14 thereof are threadedly engaged in the female ends of the stacking bolts 10' with the stacking bolts 10 being tightened to couple the body 30 and the flow component 20 together as an assembled unit. The stacking bolts 10 associated with insert means 21 are tightened to draw the cooperating faces 25 and 32 together whereby the sealing means 33 are compressed to provide a seal around the joints of aligned flow passages 24 and 36. The stacking bolts 10 associated with body 30 of insert means 21 now present an arrangement wherein the enlarged diameter portions 16 thereof project from the face 34 to provide a supporting structure for the body 30 of the next insert means 22 to be coupled in the stack. As is shown in FIG. 4, it will be apparent that a series of insert means can be stacked in end-to-end relation in this manner. Each additional insert means 22, 23 etc. is comprised of a body 30 and a plurality of stacking bolts 10 similar to that described with respect to the first insert means 21. There will be provided a sealing means in the leading face of each body 30 as is shown in this figure. It will be apparent that when insert means 21 and 22 are connected together, the male end of the stacking bolts 10 of insert means 22 are threadedly engaged in the female end of the stacking bolts 10 for insert means 21 and the body 30 of insert means 22 is mounted in the same manner as described above.

As will be apparent from a consideration of FIG. 4, each of the bodies 30 of the stacked insert means 21, 22 and 23 has a plurality of bore means 50 extending between the mating faces 32 and 34 thereof with the bore means 50 of the stacked bodies 30 being arranged in a plurality of lines each of which contains a series of interconnected stacking bolts 10. Moreover, each of the bore means 50 has an enlarged bore portion 51 adjacent the mating face 32 of the body 30 containing the same and facing the corresponding mating face 34 of an adjacent body 30, the enlarged bore portion 51 of each bore means 50 being arranged to fit over and receive the enlarged diameter portion 16 of the stacking bolt 10 that forms a bearing surface 19 adapted to contact the corresponding face 32 of a body 30 adjacent said enlarged bore portion 51. As is shown in FIG. 4, a plurality of stacking bolts 10 are arranged to present a plurality of enlarged stacking bolt portions 16 adjacent the corresponding face 34 of a previously stacked body 10 and adapted to be received in the enlarged bore portions 51 of the bore means 50 of the next body 30 to be stacked for supporting said next body 30 during the assembly thereof in stacked relation next to said previously stacked body 30.

The determination of the actual dimensions of the stacking bolts 10 in accordance with the invention is similar to that described in my copending application and is based on the relationship that the preloading of all the stacking bolts 10 should be greater than the anticipated separating force due to pressurization of the system. Accordingly, the bearing surface 19 of each stacking bolt 10 is of an area such that each stacking bolt 10 can be threadedly engaged with the corresponding system component with the stacking bolt 10 in a preloaded contact with the mounting surface without any permanent deformation at the contact area and such that the preloading of all stacking bolts together is greater than the anticipated separating force due to the pressurization of the system.

The geometry of the stacking bolt 10 is also described in detail in my copending application and is such that the bearing surface diameter allows the stacking bolt 10 to be torqued up to, or prestressed to, the mounting surface of an associated fluid flow component. As described in my copending application, this preloading is significant in that it isolates the elongation of each stacking bolt from the other components of the system. Accordingly, for a number of components in series, no one component is more likely to fail than any other. To this end, it is important that the bearing surface will not permanently deform or coin into the associated component surface due to the preloading effect produced.

The stacking bolt design of the invention permits the use of the rotational resistance means, as described in said copending application, which ensures that the last bolt in a series will loosen as opposed to any other during the disassembly procedure. This feature of the invention overcomes the problem that arises in the disassembly of the stacked bolts of the prior art whereby it cannot be predicted which of the bolts will break open first when an unscrewing rotation is applied to the bolts at the end of a series. The solution to the problem in accordance with the invention is the provision of means for resisting rotation of the stacking bolts 10 positioned within the bore means 50 in a body 30. Pursuant to the invention, the rotational resistance is operative only when the stacking bolt 10 has a body 30 supported thereon, but is not effective at the last set of stacking bolts in the series during the loosening or tightening thereof. It is noted that with the insert means in accordance with the invention, the body 30 is always removed from the stacked assembly during a stacking bolt fastening or unfastening operation. This is illustrated in FIG. 4 wherein the insert means 23 has the enlarged portions 16 of the stacking bolts 10 associated therewith extending therefrom. Accordingly the last set of stacking bolts 10 of insert means 23 can be removed as desired since there is no restraining means effective thereon.

As shown in FIG. 4, there is provided an annular resilient insert 60 held, such as by cementing, inside the enlarged bore portion 51 of the bore means 50 in each of the bodies 30. The internal diameter of the insert 60 is just less than the diameter of the wrenching portion 17 of the stacking bolt 10. Thus, insert 60 is larger than the space between the surface of the wrenching portion 17 and the wall of the enlarged bore portion 51 so as to be deformed therebetween when a stacking bolt 10 is inserted within the enlarged bore portion 51 of a bore means 50 of body 30. Accordingly, insert 60 provides engagement between body 30 and a stacking bolt 10 positioned as shown in FIG. 4 to resist rotation of the stacking bolt 10. By reason of the provision of these retaining inserts 60 in each of the bodies 30, the last set of the stacking bolts 10 in a series that are being wrenched for disassembly break open before any others in the series because the rotation of the others is resisted by the engagement with inserts 60 in the bodies 30 as is apparent from a consideration of FIG. 4.

Figure 5:
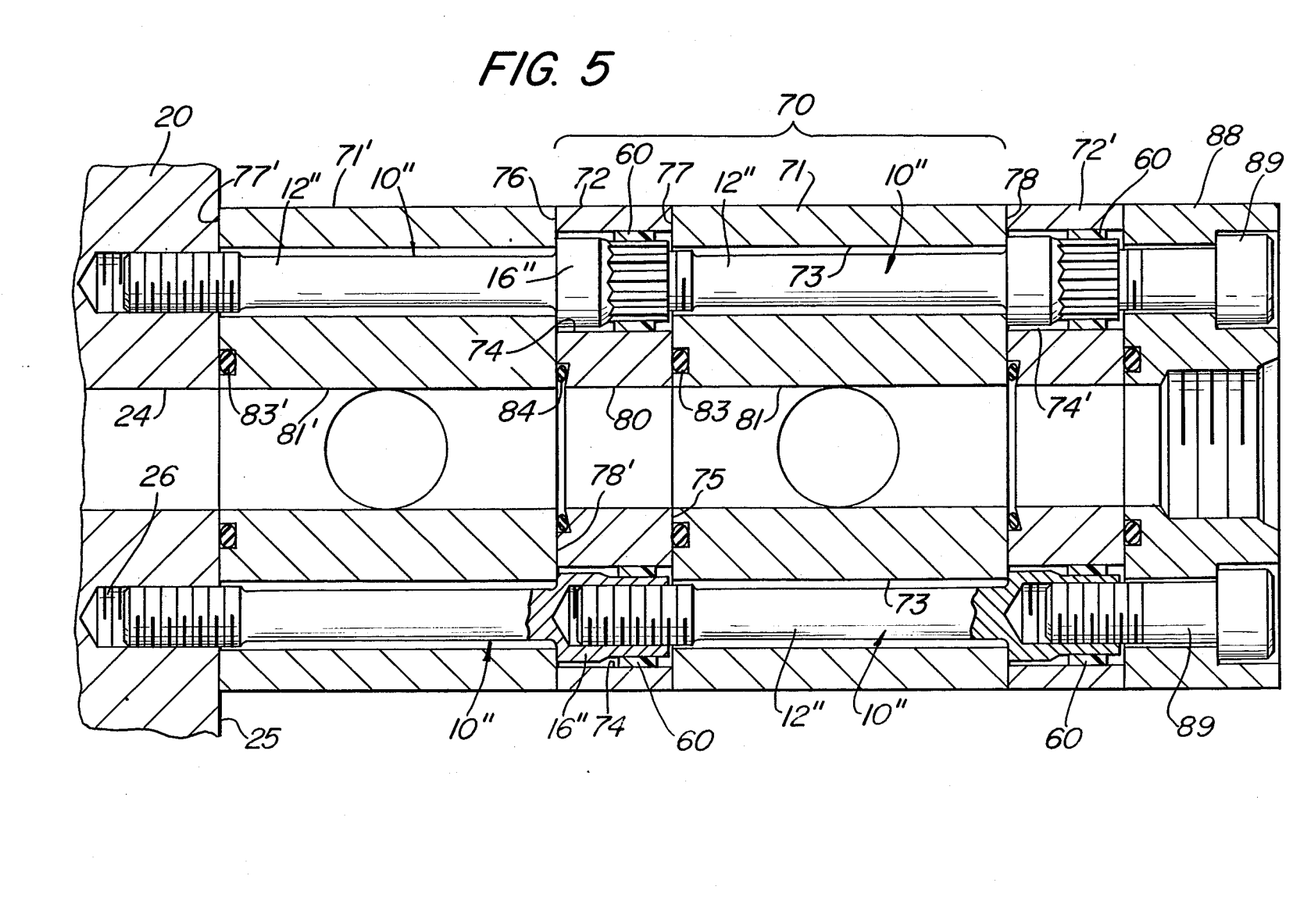
FIG. 5 is a sectional view showing a modified form of insert means wherein the body of the insert means includes a counterbore adapter plate.
Figure 6:
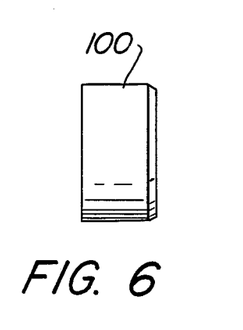
FIGS. 6–11 show another type of rotational retainer in accordance with the invention.
Figure 7:
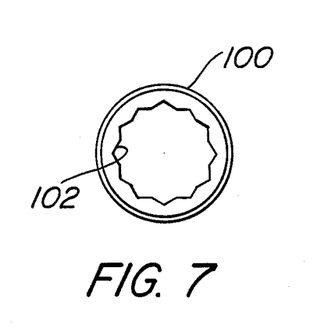
Figure 8:
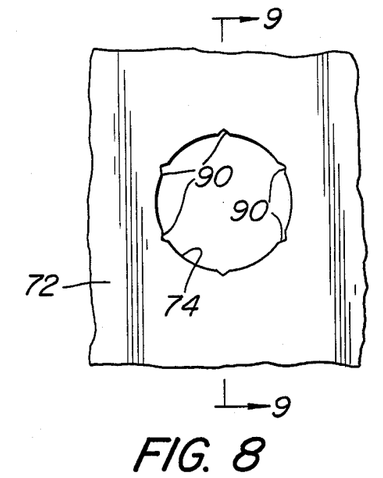
Figure 9:
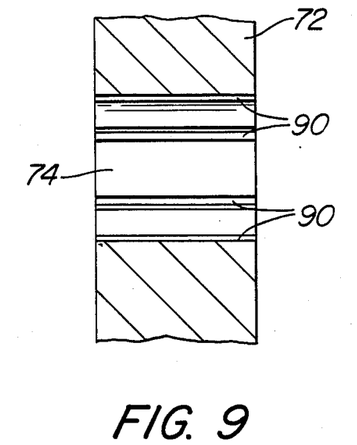

In FIG. 5 there is shown a modified form of the insert means of the invention wherein the body 70 is made of a main body portion 71 and an adapter plate portion 72. By this construction each of the bore means of a body 70 includes a cylindrical bore portion 73 formed in the body portion 71 and an enlarged bore portion 74 formed in the adapter plate portion 72. The cylindrical bore portion 73 is adapted to contain the stem portion 12" of a stacking bolt 10" and the enlarged bore portion 74 is adapted to contain the enlarged portion 16" of the stacking bolt 10" associated with the body 71' of the fluid flow component adjacent the leading face 76 of adapter plate portion 72. Except for the dimensional relationship between the stem portion 12" and the main body portion 71, stacking bolts 10" are constructed the same as stacking bolts 10, wherefore corresponding parts are given the same reference numerals with double primes added. Also, main body portion 71' is constructed the same as main body portion 71 of the two-part body 70 but has no adapter plate portion adjacent to its leading face 77' which is in contact with the face 25 of component 20.

It will be noted that when the two-part body 70 is employed, the modified starting type of stacking bolt 10' utilized in the arrangement shown in FIG. 4 is not necessary since the stem 12" of stacking bolt 10" extends beyond the leading face 77' of body portion 71' to provide threaded engagement with the threaded bore 26 of flow component 20.

As is apparent from a consideration of FIGS. 4 and 5, body 70 is the two-part equivalent of body 30. Thus, body 70 has a plurality of stacking bolts 10" associated therewith and has a block construction including end faces 76 and 78 adapted to mate with corresponding faces of the fluid components of the system adjacent thereto. Body 70 has a fluid flow passage for the flow of fluid between faces 76 and 78, said passage comprising a central bore 80 in adapter plate portion 72 and an aligned central bore 81 in main body portion 71 as shown in FIG. 5. In the arrangement shown in FIG. 5, body 70 is mounted with its flow passage in fluid flow communication with the flow passage 81' of body 71' which is mounted by stacking bolts 10" onto the fluid flow component 20 which has a fluid flow passage discharge opening 24 in the face 25 thereof which mates with the face 77' of body 71'. Flow passages 24, 81', 80 and 81 are aligned and in flow communication as shown in FIG. 5. Also, each of the bodies 71 and 71' is provided with a cross passage for use in the fluid flow system as desired. The joint of each of the adjacent flow passages is provided with a sealing means as shown in FIG. 5. Thus, body 71' is provided with an O-ring sealing means 83' in its end face 77'. Also, the opening of passage 80 at end face 76 is provided with a counterbore which receives an 0-ring type of seal 84 which is concentric with passage 80 and is adapted to seal the joint between the aligned flow passages 81' and 80 to thereby seal the fluid flow between the mating faces 76 and 78'. Also, body 71 is provided with an O-ring seal 83 in the face 77 thereof to seal the fluid flow between the flow passages 80 and 81 between the mating faces 77 and 75.

It will be apparent that additional two-part bodies 70 may be added onto the body 70 shown in FIG. 5 if desired. In this arrangement the stacked assembly utilizes only one body 70 and the arrangement is terminated by means of an adapter plate portion 72', identical to adapter plate 72, and coupled to main body portion 71 by an end plate 88 and conventional bolts 89 which are engaged in the female end of the stacking bolts 10" in the arrangement shown in FIG. 5.

As in the case of the arrangement shown in FIG. 4, the enlarged bore portions 74 and 74' in adapter plate portions 72 and 72', respectively, are furnished with the resilient inserts 60 described above. These resilient inserts 60 serve the important function of providing means for restricting the rotation of a series of stacking bolts 10" so that one can be certain that only the last bolt in that series will loosen during disassembly thereof. It is desirable that this rotation restricting means act on the wrenching surface of the stacking bolt 10" because this surface is enclosed within a bore 74 or 74' of the adapter plate portion 72 and 72' except during a fastening or unfastening thereof. It is in this manner, that the sequence of bolt loosening can be predicted.

The resilient inserts 60 are annular and made of a resilient material that withstands large amounts of deflection without permanent deformation. The inserts 60 function by deforming around the wrenching surface when a stacking bolt is positioned within the enlarged bore portion receiving the same and provide a certain amount of resisting force to rotation of the stacking bolt. The inserts 60 are designed to return to their original shape due to their resiliency and, accordingly, can be used over and over again in the same manner. To this end, inserts can be made of rubber or a resilient plastic material.

It should be noted that the inserts 60 can be keyed to either the bore 74 or to the wrenching surface of the stacking bolt, but not to both. For example, the outside of the insert 60 can be cemented to the bore 74 as is described in the embodiments of FIGS. 4 and 5 and thereby provide a positive lock whereby the stacking bolt can rotate within the insert 60 before the insert 60 rotates within the bore. Likewise, while the insert 60 could be machined to match the hexagonal pattern of the stacking bolt wrenching portion to ensure a close fit if desired, this shaped insert 60 could not also be cemented to the bore 74 as the orientation of the hexagonal pattern with respect to the bore 74 is not certain.

It is also to be noted that for a given interference between a stacking bolt and a rotation resisting insert, the amount of rotation resistance is proportional to the hardness of the insert material. In other words, the harder the insert material, the more resistance to rotation.

Figure 10:
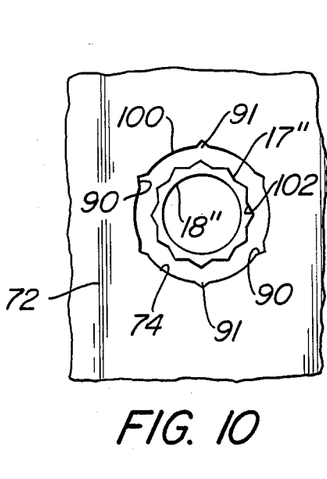
Figure 11:
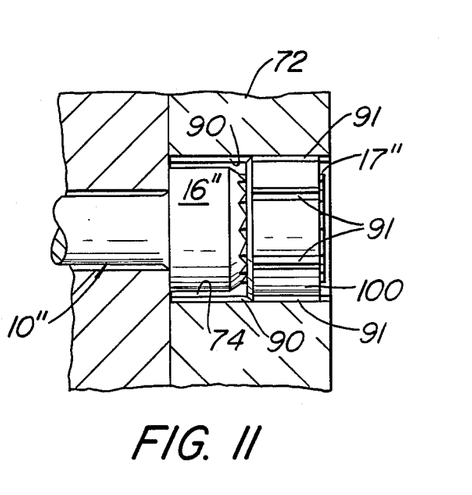

In FIGS. 6-11 there is shown an annular insert 100 made of a material such as nylon and formed with a central cavity 102 in a twelve pointed configuration to match the shape of the twelve pointed wrenching portion 17" of a stacking bolt. The insert 100 is particularly useful with the two-part body construction shown in FIG. 5 since, for ease of installation, the insert 100 would be inserted into the bore 74 of the adapter plate portion 72 after the adapter plate portion 72 is positioned to contain the head of the stacking bolt 10". The assembled condition is shown in FIG. 11.

It will be noted that large forces will be required to deform an insert 100 made of a material such as nylon around the conformed twelve point wrenching surface 17" during rotation. Also, the bore 74 is desirably provided with six circumferentially equally spaced longitudinally extending recesses 90 into which the insert material can deform during assembly, insert 100 being of a size so as to be deformed when inserted into the space between wrenching portion 17" and the opposed wall portion of bore 74. FIGS. 10 and 11 show the six portions 91 on the surface of an insert 100 that have deformed into recesses 80. It will be apparent that large forces are required to rotate the insert 100 inside this recess containing bore 74.

The insert 100 shown in FIGS. 6-11 provides improved resistance to rotation over the annular resilient insert 60. However, a hard material such as nylon cannot undergo large deflections without becoming permanently set, as can the highly resilient material, such as rubber, out of which the insert 60 could be made. Therefore, the inserts 100 are designed so as to have a limited amount of deformation into the longitudinal recesses 90 in bore 74 so that there is no permanent deformation of the insert 100 which would make it useless should the components have to be taken apart and reassembled.

It is also to be noted that for a given amount of resisting torque, less material deformation is necessary between the body bore and the insert than between the insert and the stacking bolt, since the moment arm is greater at the outside diameter of the insert. It is for this reason that the insert 100 is keyed to the wrenching surface 17" of the stacking bolt and allowed to deform into the counterbore 74 as opposed to the opposite arrangement. Also, if the design allows no mechanical locking along the longitudinal axis other than friction, disassembly is faciliated especially when using an insert material with a low coefficient of friction, such as nylon.

It is also to be noted that the embodiments of the invention shown in FIGS. 4 and 5 could be designed with another means of resisting bolt rotation as described in said prior-mentioned application. This means does not require any insert means and involves a construction whereby the depth of the enlarged bore in the body is slightly shorter than the stacking bolt head and the body is made of a softer material than the stacking bolt. As is described in said prior-mentioned application, by this construction the stacking bolt will coin itself into the bottom of the body bore and be restricted from rotating.

The stacking bolt in accordance with the invention can be utilized in several different ways with various insert body configurations. In the arrangement shown in FIG. 4, for example, each body 30 of the insert means 21, 22 and 23 is provided with enlarged bore portions 51 to accept the enlarged diameter portions 16 and 16' of the previously installed stacking bolt 10 or 10' during assembly thereof. The lengths of the stacking bolt 10 associated with each insert body 30 are such that the distance from the bearing surface 19 of the stacking bolt 10 to the tip of the threaded end 14 thereof is enclosed entirely within the associated insert body bore 50. During the assembly procedure, it is necessary to fasten starting stacking bolts 10' to the initial mounting surface 25 of flow component 20. Since the male threaded portion 14 of a subsequent stacking bolt 10 is enclosed within its insert body 30, it cannot directly engage the threaded bores 26 in the mounting surface 25 thereby requiring the use of the starting stacking bolts 10'. During assembly, the insert body 30 of the first insert means 21 is brought up to the mounting surface 25 and its stacking bolts 10 are engaged with the starting stacking bolts 10'. It is noted that in addition to providing for threaded engagement with subsequent stacking bolts 10, the starting stacking bolts 10' help to align the component body 30 of the first insert means 21 and support it during assembly. It is noted that the back surface 34 of body 30 of insert means 21 provides a mounting surface similar to the original mounting surface 25 for the component 20. Such a mounting surface with the internally threaded enlarged portions 16 or 16' of stacking bolts 10 or 10' extending from a sealing plane will be referred to hereafter as a "TYPE A" mounting surface. As is apparent from FIG. 4, a plurality of insert means, such as 22 and 23, can be fastened in an end-to-end manner indefinitely as each insert body 30 and associated stacking bolts provide a TYPE A mounting surface for each subsequent insert means. At the end of this series of insert means it may be desirable to execute a transition to some form of tubing to carry the fluid to where it is needed. This is most often accomplished with a flange fitting. However, standard flange fittings are not compatible with the TYPE A mounting surface and cannot be used directly. Standard flange fittings are compatible with conventional mounting surfaces of the type of the original mounting surface 25 of flow component 20 prior to the addition of the starting bolts 10' of FIG. 4. Thus, the last mounting surface in the series of insert means must be converted to a conventional mounting surface prior to the use of a standard flange. To this end, there may be used an adapter plate portion of the type shown in FIG. 5 at 72 or 72' containing enlarged bores 74 and 74' which accept the enlarged heads 16 of stacking bolts 10.

Figure 12:
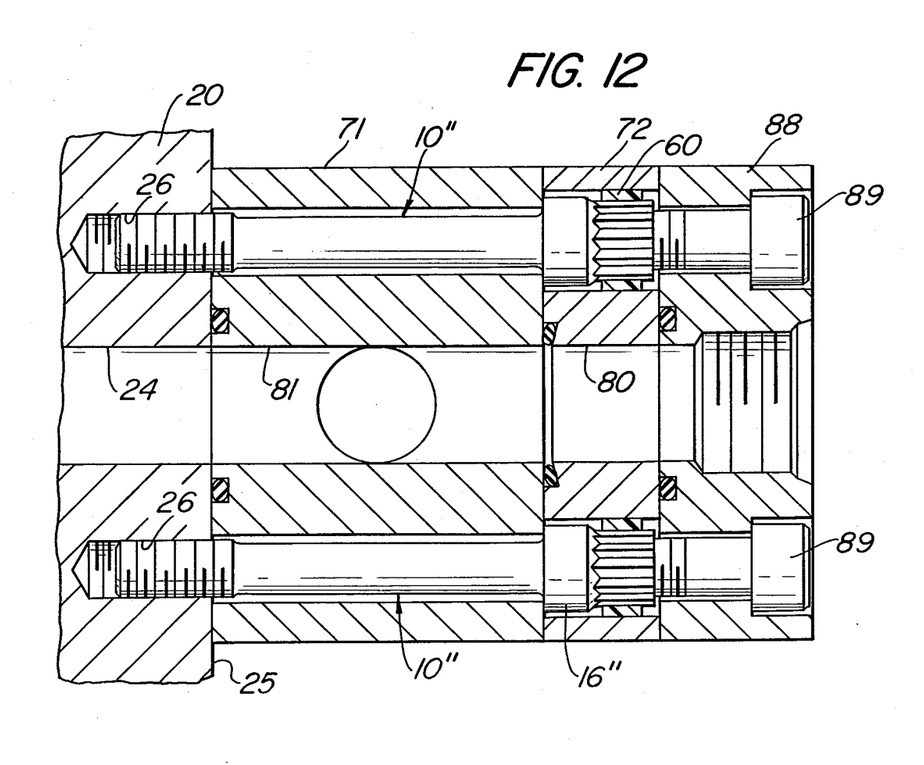
FIGS. 12, 13, 14 & 15 illustrate other embodiments of the invention.
Figure 13:
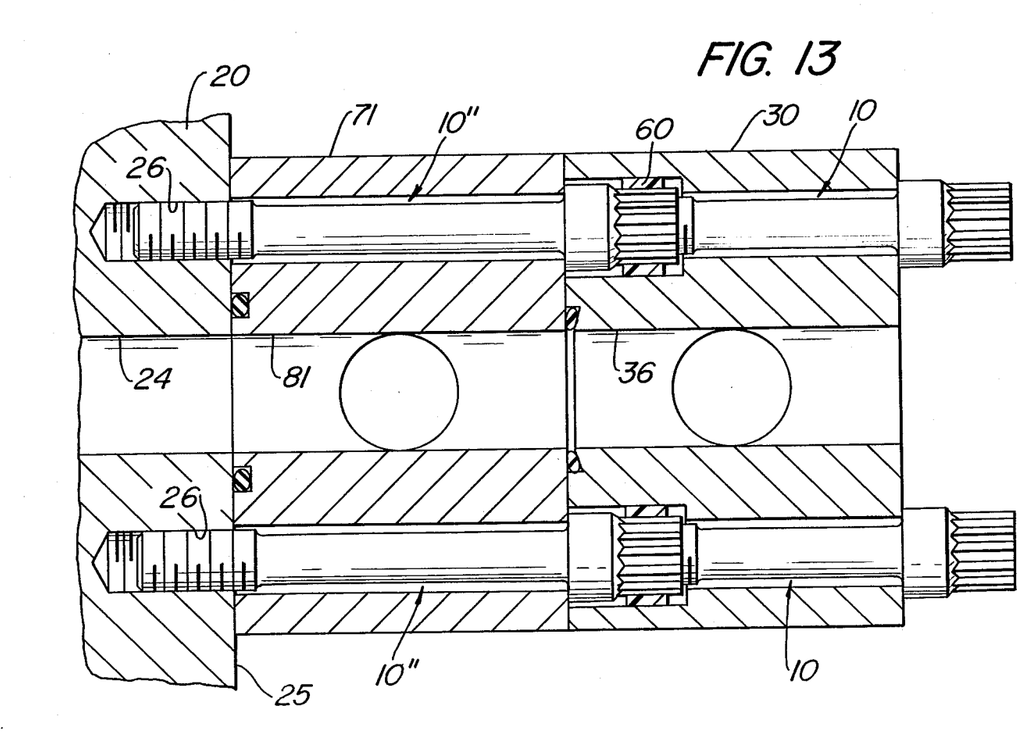

Another arrangement in accordance with the invention using stacking bolts and insert body means of the invention is shown in FIG. 12. In this configuration, the enlarged bores adapted to receive the enlarged wrenching heads 16" of stacking bolts 10" are not part of the insert body, but rather are part of an adapter plate portion 72, which arrangement is much like that used in the mounting surface transition described above with respect to the FIG. 4 arrangement. In the arrangement shown in FIG. 12, the male threads of the stacking bolts 10" are not enclosed in the insert body 71, but extend therefrom so that the body 71 can be fastened directly to a conventional mounting surface provided at face 25 of flow component 20. Once fastened, an adapter plate portion 72 is used to convert the TYPE A mounting surface provided to a conventional mounting surface and the next component, such as a standard flange 88, can be added. If the adapter plate portion 72 is not utilized, an insert body 30 of the type shown in FIG. 4 can be fastened to the TYPE A mounting surface provided by the stacking bolts 10" by means of stacking bolts 10 as is shown in FIG. 13.

The arrangement shown in FIG. 12, wherein only one insert body 71 is used, can be useful in certain applications. For example, consider the need for a shut-off valve between a mounting surface and a flange from which some form of tubing will be attached. In this case, the valve can be used to shut off the flow while the tubing is repaired, the down line filter replaced, etc. With only the valve and a flange to be fastened to the mounting surface, one might be tempted to use long, standard bolts. However, should it become necessary to remove the flange, the shutoff valve must also be removed. This defeats the purpose of having the valve to shut off the flow during maintenance and repair. When an arrangement such as shown in FIG. 12 is used, the flange 88 can be removed while the integrity of the system is maintained.

Figure 14:
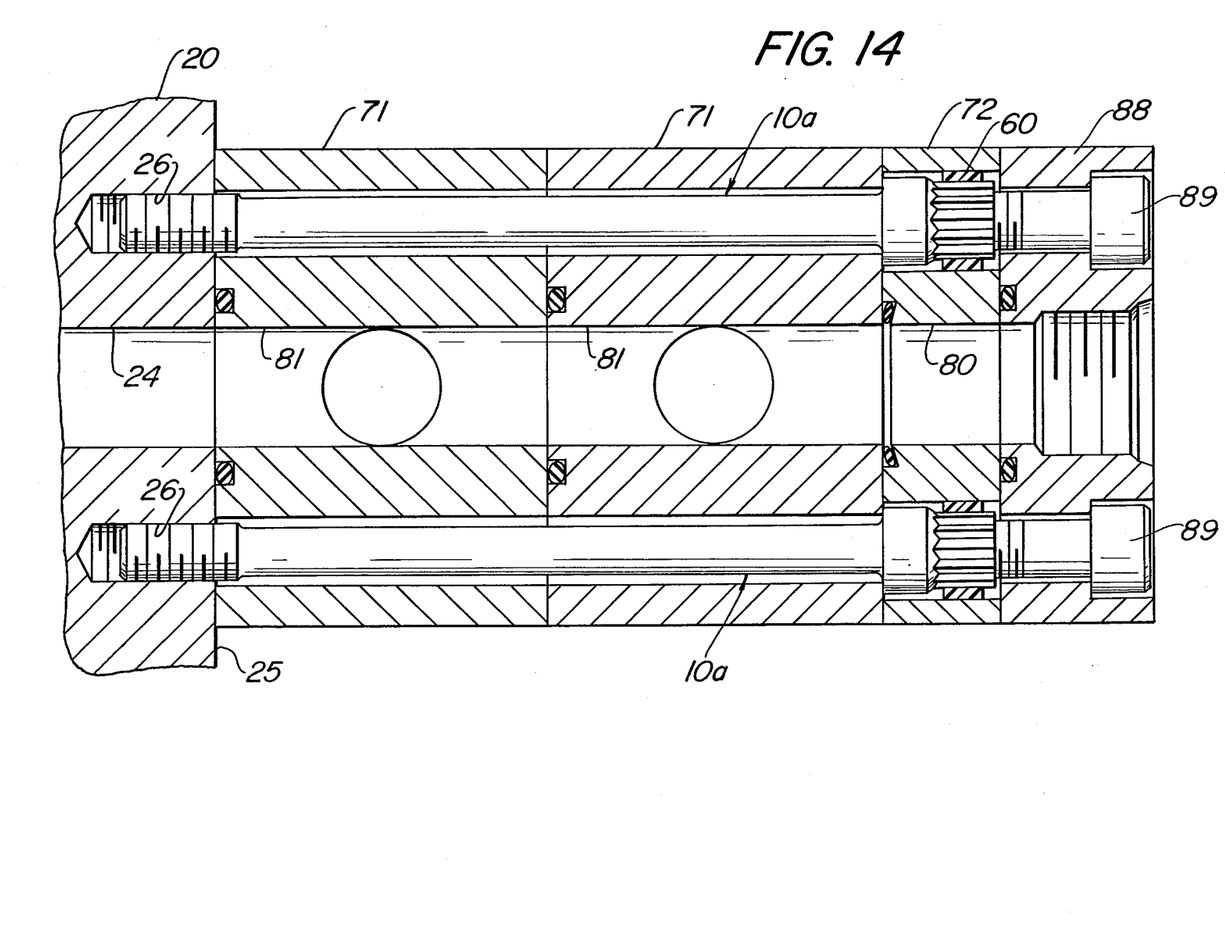

In FIG. 14 there is shown an embodiment of the invention which may be desirable for systems using only a few components in a series. In this embodiment the stacking bolt arrangement shown is similar to that of FIG. 12 (although the stacking bolt arrangement shown in FIG. 4 can also be utilized). The arrangement of FIG. 14 is different from the prior embodiments since the stacking bolts 10a are shared by more than one insert body 71. Stacking bolts 10a are the same as stacking bolts 10" except for being longer. As is shown in FIG. 14, the long stacking bolts 10a extend through two of the bodies 71 stacked adjacent one another. Otherwise the arrangement of FIG. 14 is identical to that shown in FIG. 12, as is apparent from a consideration of these two figures. It is noted that while the embodiment shown in FIG. 14 uses fewer parts than the previous embodiments and requires fewer assembly steps, the combination of the two bodies 71 to form essentially one heavy component may make assembly slightly more difficult.

It will be apparent that each of the various embodiments of the invention have certain advantages. Thus, the embodiment of the invention shown in FIG. 4 has the advantages of (1) using a minimum length of the components and (2) providing alignment and support by the preceeding stacking bolt. The embodiment of the invention shown in FIG. 12 has the advantage of (1) no starting studs are needed, and (2) it is compatible with standard mounting surface flanges. The embodiment of the invention shown in FIG. 14 has the advantages of (1) fewer parts are required, (2) no starting studs are needed, and (3) it is compatible with standard mounting surface flanges.

Figure 15:
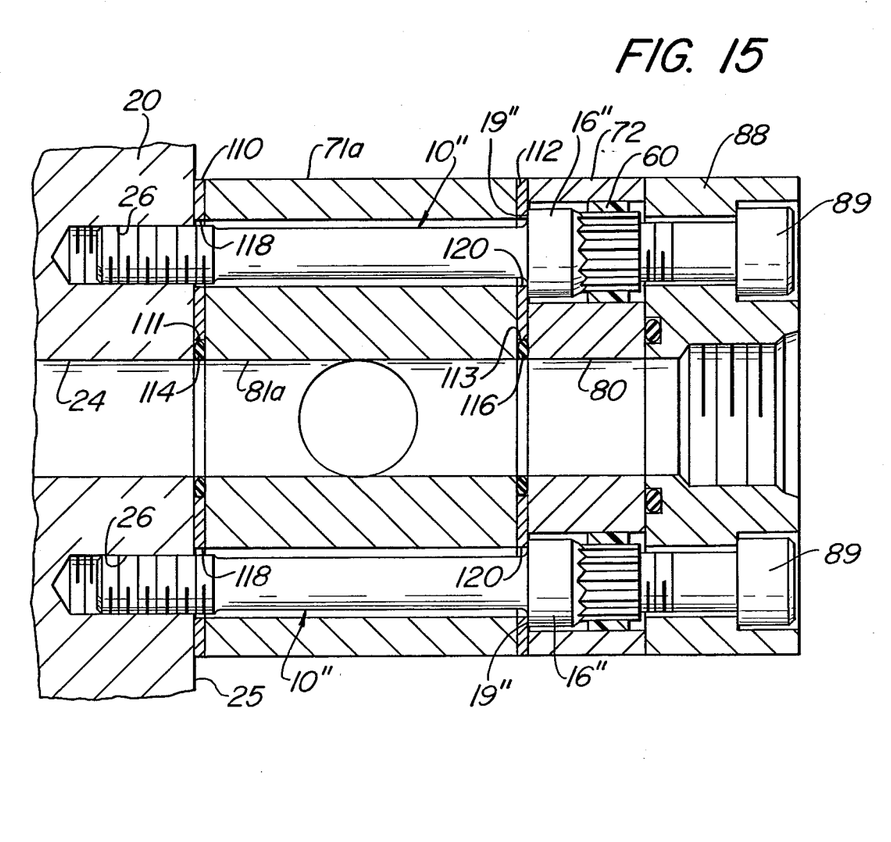

FIG. 15 shows an arrangement similar to that shown in FIG. 12 except that there is provided another type of sealing means between the mating faces of adjacent fluid flow components of the system. The 0-ring sealing means shown in FIG. 12 are housed in recesses machined in the leading faces of body 71 and adapter plate portion 72. The sealing means shown in FIG. 15 utilizes a seal plate to house the seal cavities to provide an effective seal which eliminates the need for expensive machining and turning operations on body 71 and adapter plate portion 72. The seal plates can be mass produced by a suitable stamping method and, therefore, would be more economical than the arrangement shown in FIG. 12.

As shown in FIG. 15, a pair of relatively thin seal plates 110 and 112 are located in mating contact with both the leading and trailing faces of the insert body 71a which is fastened to face 25 of flow component 20 by a plurality of stacking bolts 10". Except for the provision of a different type of sealing means, insert body 71a is similar to insert body 71 described above. An adapter plate portion 72 is utilized adjacent seal plate 112 to provide a conventional mounting surface for the standard flange 88 which is fastened adjacent the adapter plate portion 72 by means of bolts 89.

Seal plates 110 and 112 are provided with circular holes 118 and 120, respectively, constructed and arranged to be aligned with the cylindrical bores in body 71a containing the stem portion of stacking bolts 10". Holes 118 and 120 are the same size as the aligned cylindrical bores containing the stem portions of stacking bolts 10". By this arrangement, seal plates 110 and 112 are located by the stem portions of stacking bolts 10" in the position as shown in FIG. 15. It is noted that the stacking bolts 10" contact the outer face of seal plate 112 at their bearing surfaces 19" in the same manner as the stacking bolts 16" in FIG. 12 contact the trailing face of body 71. The stacking bolts 10" extend through the cylindrical bores in body 71a and extend through bores 118 with their male ends in threaded engagement with threaded bores 26 in flow component 20 as shown in FIG. 15.

The seal plates 110 and 112 are provided with centrally located cylindrical holes 111 and 113, respectively. 0-ring sealing members 114 and 116 are contained within circular holes 111 and 113 and are constructed and arranged to encircle the flow passage 81a in body 71a as is apparent from a consideration of FIG. 15. O-ring sealing members 114 and 116 are shown in their compressed condition in FIG. 15 providing good sealing contact between the opposed mating faces between sealing plate 110 and face 25 of fluid component 20 and between sealing plate 112 and the leading face of adapter plate portion 72. The arrangement whereby the bearing surface 19" of enlarged portions 16" of stacking bolts 10" are in bearing contact with the sealing plate 112 provides the optimum geometry to give the maximum strength to the backup for the O-ring seals 116.

It will be noted that the outer faces of sealing plates 110 and 112 in effect provide the mating faces of body 71a with the adjacent fluid flow components of the system and in this regard could be considered to be part of the body 71a.

What is claimed is:

1. A fluid flow system having a plurality of fluid flow components coupled to one another in end-to-end stacked relation wherein each of said fluid flow components comprises:

a body having a plurality of faces, two of said faces being adapted to mate with corresponding faces of the fluid flow components of the system adjacent thereto, said body having a fluid flow passage for the flow of fluid between said two faces, and a plurality of stacking bolts associated with each body, each of said stacking bolts having a stem portion providing an externally threaded male end and an enlarged portion providing an internally threaded female end, said enlarged portion forming a bearing surface facing toward said male end and constructed and arranged to contact one of said mating body faces during the assembly of said bodies in stacked relation, said stacking bolts being interconnected at said male and female ends in a plurality of series of end-to-end stacking bolts, each of said bodies having a plurality of bore means extending between said two faces thereof, said bore means of the stacked bodies being arranged in a plurality of lines each of which contains a stacking bolt series, each of said bore means having an enlarged bore portion adjacent one of said two mating faces of the body containing the same and facing the corresponding mating face of an adjacent body, said enlarged bore portion of each bore means being arranged to fit over and received the enlarged portion of a stacking bolt, a plurality of stacking bolts being arranged to present a plurality of enlarged stacking bolt portions adjacent the corresponding face of a previously stacked body and adapted to be received in the enlarged bore portions of the bore means of the next body to be stacked for supporting said next body during the assembly thereof in stacked relation next to said previously stacked body.

2. A system according to claim 1 wherein said enlarged portion of each stacking bolt has a wrenching portion extending inwardly from the female end thereof and having a surface configuration adapted to be engaged by a wrench or the like.

3. A system according to claim 1 wherein each of said bore means in said body is constructed so that said enlarged portion of a stacking bolt is contained entirely within said enlarged bore portion, and the distance between said bearing surface and the male end of said stem portion is less than the distance between said two faces of said body.

4. A system according to claim 1 wherein sealing means are mounted on one of said body faces to extend around said fluid flow passage, said sealing means being adapted to make a sealing contact with the corresponding face of the flow system component.

5. A system according to claim 4 wherein said sealing means comprises a counterbore recess formed in said one body face concentric with said fluid flow passage and an annular sealing member contained in said counterbore recess.

6. A system according to claim 1 wherein said bearing surface of said each stacking bolt is of an area such that each stacking bolt can be threadedly engaged with the corresponding system component with the stacking bolt in a preloaded contact with the mounting surface without any permanent deformation at the contact area and such that the preloading of all stacking bolts together is greater than the anticipated separating force due to the pressurization of the system.

7. A system according to claim 1 including means for resisting rotating of the stacking bolt positioned within at least one of said bore means of a previously stacked body including an insert member providing engagement between said enlarged portion of said last-named stacking bolt and said enlarged bore portion of a bore means of the next body to be stacked.

8. A system according to claim 7 wherein said means providing engagement between said enlarged portion of said stacking bolt and said enlarged bore portion includes an annular insert made of a resilient material and extending around the wall of said enlarged bore portion, said annular insert being larger than the space between said enlarged portion of said stacking bolt and the wall of said enlarged bore portion so as to be deformed therebetween.

9. A system according to claim 3 wherein said body includes a body portion and an adapter plate portion, each of said bore means having a cylindrical bore portion thereof formed in said body portion and said enlarged bore portion thereof formed in said adapter plate portion, said cylindrical bore portion being adapted to contain said stem portion of a stacking bolt and said enlarged bore portion being adapted to contain said enlarged portion of a stacking bolt, said adapter plate portion being adapted to be mounted in face-to-face contact with said body portion.

10. A system according to claim 9 wherein said adapter plate defines a portion of said fluid flow passage and comprises sealing means encircling said fluid flow passage for sealing said contacting face thereof against a contacting face of said body portion.

11. For use in a fluid flow system having a plurality of fluid flow components including a pair of adjacent inserts each of which has a body adapted to mate with corresponding faces of the fluid flow components of the system adjacent thereto, means for coupling together the pair of adjacent inserts comprising:

a plurality of stacking bolts each of which has a stem portion providing an externally threaded male end and an enlarged diameter portion providing an internally threaded female end, said enlarged diameter portion being located adjacent said stem portion thereof and forming a bearing surface facing toward said male end and constructed and arranged to contact a mating face of the insert in which the stem portion thereof extends so as to project therefrom during the coupling together of said adjacent inserts.

12. Coupling means according to claim 11 wherein a first group of said stacking bolts is adapted to have said stem portions thereof received in a bore means in the body of one of said inserts with the male end thereof arranged to engage a system component adjacent to said one insert and with the bearing surface of each stacking bolt in bearing contact with a mating face of said one insert.

13. Coupling means according to claim 12 wherein a second group of said stacking bolts is adapted to be received in bore means in the body of the other of said inserts, said male ends of each of said second group of stacking bolts being adapted to threadedly engage the female ends of said first group of stacking bolts with the bearing surfaces of said second group of stacking bolts in bearing contact with a face of said other insert.

14. Coupling means according to claim 13 wherein the bearing surface of each stacking bolt of said second group is of an area such that each said stacking bolt can be threadedly engaged with the corresponding stacking bolt of said first group with said second group of stacking bolts in a preloaded bearing contact at said bearing surfaces thereof without any permanent deformation at the contact area with said face of said other insert and such that the preloading of all stacking bolts of said second group together is greater than the anticipated separating force on said pair of inserts due to the pressurization of the system.

15. Coupling means according to claim 11 wherein each stacking bolt has a wrenching portion extending inwardly from the female end thereof and having a surface configuration adapted to be engaged by a wrench or the like.

16. A system according to claim 1 wherein at least one of said bodies is constructed of two parts including a main body portion and an adapter plate portion, each of said bore means in said one body having a first bore portion thereof formed in said main body portion and an enlarged bore portion thereof formed in said adapter plate portion, said first bore portion being adapted to contain said stem portion of a stacking bolt associated with said one body and said enlarged bore portion being adapted to fit over and contain an enlarged portion of a stacking bolt providing the threaded female end connected to said threaded male end of an associated stacking bolt, said adapter plate portion being adapted to be mounted in face-to-face contact with said main body portion.

17. A system according to claim 16 wherein said main body portion and said adapter plate portion each define a portion of said fluid flow passage, and including sealing means encircling said fluid flow passage portion for sealing said contacting faces of said main body portion and said adapter plate portion.

18. A system according to claim 16 wherein said enlarged portion of each stacking bolt has a wrenching portion extending inwardly from the female end thereof and having a surface configuration adapted to be engaged by a wrench or the like.

19. A system according to claim 16 including means for resisting rotating of the stacking bolt positioned within at least one of said bore means including an insert member providing engagement between said enlarged bore portion in said adapter plate portion and said enlarged portion of the stacking bolt contained therein.

20. A system according to claim 19 wherein said means providing engagement between said enlarged portion of said contained stacking bolt and said enlarged bore portion in said adapter plate portion includes an annular insert made of a resilient material and extending around the wall of said last-named enlarged bore portion, said annular insert being larger than the space between said enlarged portion of said contained stacking bolt and the wall of said last-named enlarged bore portion so as to be deformed therebetween.

21. A system according to claim 19 wherein said enlarged portion of said contained stacking bolt has a wrenching portion extending inwardly from the female end thereof and having a surface configuration adapted to be engaged by a wrench, said insert being annular and having its inner wall adapted to conform to the surface configuration of said wrenching portion, said annular insert being of a size so as to be deformed when inserted in the space between said wrenching portion and the opposed wall portion of said enlarged bore portion.

22. A system according to claim 21 wherein said opposed wall portion of said enlarged bore portion has recesses therein for receiving deformed portions of the outer wall of said annular insert upon insertion thereof.

23. A system according to claim 7 wherein said enlarged portion of each stacking bolt has a wrenching portion extending inwardly from the female end thereof and having a surface configuration adapted to be engaged by a wrench, said insert being annular and having its inner wall adapted to conform to the surface configuration of said wrenching portion, said annular insert being of a size so as to be deformed when inserted in the space between said wrenching portion and the opposed wall portion of said enlarged bore portion.

24. A system according to claim 23 wherein said opposed wall portion of said enlarged bore portion has recesses therein for receiving deformed portions of the outer wall of said annular insert upon insertion thereof.

25. A fluid flow system having a plurality of fluid flow components coupled to one another in end-to-end stacked relation wherein at least one of said fluid flow components comprises:
   a body having a plurality of faces, two of said faces being adapted to mate with corresponding faces of the fluid flow components of the system adjacent thereto,
   said body having a fluid flow passage for the flow of fluid between said two faces,
   and a plurality of stacking bolts associated with said body,
   each of said stacking bolts having a stem portion providing an externally threaded male end and an enlarged portion providing an internally threaded female end, said enlarged portion forming a bearing surface facing toward said male end and constructed and arranged to contact one of said mating body faces during the assembly of said body in stacked relation in the flow system,
   said stacking bolts being interconnected at said male and female ends with associated adjacent fluid flow components of the system.

26. A system according to claim 25 including an adapter body portion having a pair of faces adapted to mate with corresponding faces of the fluid flow components of the system adjacent thereto, one of said pair of faces being adapted to mate with said one mating body face of said body contacted with said bearing surface formed on said enlarged portion of each stacking bolt, said adapter body portion having an enlarged bore portion formed therein and constructed and arranged to fit over and contain said enlarged portion of the stacking bolt, the other of said pair of faces of said adapter body portion being adapted to mate with an adjacent fluid flow component of the system.

27. A system according to claim 26 wherein said body and said adapter body portion each define a portion of a fluid flow passage and including sealing means circling said fluid flow passage for sealing said contacting faces of said body and said adapter body portion.

28. A system according to claim 26 including means for resisting rotating of the stacking bolt associated with said body including an insert member providing engagement between said enlarged bore portion in said adapter body portion and said enlarged portion of the stacking bolt contained therein.

29. A system according to claim 28 wherein said means providing engagement between said enlarged portion of said contained stacking bolt and said enlarged bore portion in said adapter body portion includes an annular insert made of resilient material and extending around the wall of said last-named enlarged bore portion, said annular insert being larger than the space between said enlarged portion of said contained stacking bolt and the wall of said enlarged bore portion so as to be deformed therebetween.

30. A system according to claim 28 wherein said enlarged portion of said contained stacking bolt has a wrenching portion extending inwardly from the female end thereof and having a surface configuration adapted to be engaged by a wrench, said insert being annular and having its inner wall adapted to conform to the surface configuration of said wrenching portion, said annular insert being of the size so as to be deformed when inserted in the space between said wrenching portion and the opposed wall portion of said enlarged bore portion.

31. A system according to claim 30 wherein said opposed wall portion of said enlarged bore portion has recesses therein receiving deformed portions of the outer wall of said annular insert upon insertion thereof.

32. A system according to claim 25 wherein at least one of said mating faces of said body is formed by a seal plate having a hole therein adapted to contain an annular sealing member constructed and arranged to encircle said fluid flow passage in said body and to make sealing contact with the adjacent fluid flow component of the system.

33. A system according to claim 1 wherein at least one of said mating faces of said body is formed by a seal plate having a hole therein adapted to contain an annular sealing member constructed and arranged to encircle said fluid flow passage in said body and to make sealing contact with the adjacent fluid flow component of the system.

* * * * *